United States Patent [19]
Col et al.

[11] Patent Number: 5,864,701
[45] Date of Patent: Jan. 26, 1999

[54] APPARATUS AND METHOD FOR MANAGING INTERRUPT DELAY ASSOCIATED WITH MASK FLAG TRANSITION

[75] Inventors: Gerard Col; Glenn Henry, both of Austin, Tex.

[73] Assignee: Integrated Device Technology, Inc., Santa Clara, Calif.

[21] Appl. No.: 800,611

[22] Filed: Feb. 14, 1997

[51] Int. Cl.⁶ .............................. G06F 13/00; G06F 13/24
[52] U.S. Cl. ............................................ 395/733; 395/591
[58] Field of Search ..................................... 395/733, 580, 395/591; 364/241.2, 247, 230.2, 261.3, 262.4, 263.2, 280, 280.8

[56] References Cited

U.S. PATENT DOCUMENTS

| | | | |
|---|---|---|---|
| 4,833,598 | 5/1989 | Imamura et al. | 364/200 |
| 5,367,689 | 11/1994 | Mayer et al. | 395/725 |
| 5,560,018 | 9/1996 | Macon, Jr. et al. | 395/733 |
| 5,689,720 | 11/1997 | Nguyen et al. | 395/800 |

*Primary Examiner*—Meng-Ai T. An
*Assistant Examiner*—Frantz B. Jean
*Attorney, Agent, or Firm*—James W. Huffman

[57] ABSTRACT

A method and apparatus for handling interrupts after transition of a mask flag is provided. In x86 processors, if the IF flag is cleared, interrupts are to be masked. If the IF flag is set, interrupts are to be handled. However, if the IF flag transitions from a clear state to a set state, and the instruction which sets the IF bit is an STI instruction, then a pending interrupt is to be delayed for one instruction, unless the following instruction is a floating point instruction, and then the interrupt is to be handled immediately. The invention allows an interrupt to cause a branch to an exception handler if the IF bit is set. The exception handler determines whether the prior instruction was an STI instruction, and whether the prior state of the IF bit was clear. If both these conditions are true, the exception handler branches back to the main program. If either condition is not true, the exception handler branches to an interrupt service routine.

34 Claims, 6 Drawing Sheets

APPARATUS AND METHOD FOR MANAGING INTERRUPT DELAY ASSOCIATED WITH MASK FLAG TRANSITION

BACKGROUND OF THE INVENTION

1. Field of the Invention

This invention relates in general to the field of interrupt handling in computer systems, and more particularly to handling interrupts after transition of an interrupt mask flag within a control register.

2. Description of the Related Art

Within a computing system, input/output (I/O) devices often require assistance, or servicing, by the computing system. To communicate with the computing system, I/O devices use a signal line known as an interrupt request line to request the computing system's assistance.

The kind of servicing which an I/O device needs is defined by the type of device and its current condition. For example, a parallel port connected to a printer may generate an interrupt request to ask the computing system for the next character to be sent to the printer. In this case, the computing system would respond by performing an I/O write bus cycle to send the next character to the parallel port.

Another example would be the interrupt request generated by a hard disk controller to tell the computing system that a data transfer to or from memory has been completed. If this were a disk read operation, for example, the computing system would respond to the interrupt request by using the data that has been transferred from the disk controller into memory.

A third example would be when a keyboard interface generates an interrupt request to inform the computing system that a key has been pressed. The computing system should respond by performing an I/O read from the keyboard interface to get the keyboard character.

In each of the above cases, the computing system responds to an interrupt request by executing a special program known as an interrupt service routine. The interrupt service routine's task is to service the request. Different types of interrupt requests require different types of servicing on the part of the computing system. This means that there must be a separate interrupt service routine for each type of interrupt request that can be generated by the various I/O devices connected to the computing system.

When an interrupt occurs, the computing system temporarily suspends execution of the current program and forces it to jump to another program, the interrupt service routine. At the conclusion of the interrupt service routine, the computing system returns program flow at the point where it was interrupted.

To better illustrate interrupts, and their effect on program flow, attention is directed to FIGS. 1 and 2.

Referring to FIG. 1, a computer system 100 is shown. The computer system 100 includes a microprocessor 102 connected to a data bus 104. The microprocessor 102 is also connected to an interrupt controller 106 via an interrupt line 108 and a control bus 110. The interrupt controller 106 is connected to a plurality of hardware devices including: a system timer 112, a keyboard interface 114, a serial port 116, a floppy disk controller 118, a hard disk controller 120 and a parallel port 122. Also connected to the interrupt controller are a number of expansion slots 124.

In operation, when any of the hardware devices 112–124 wish to communicate with the microprocessor 102, they provide a signal to the interrupt controller 106. The interrupt controller is used as an interface between the microprocessor 102 and the hardware devices 112–124. The interrupt controller 106 receives signals from the hardware devices 112–124, determines which hardware device 112–124 requires access to the microprocessor 102, and sends an interrupt signal on line 108 to the microprocessor 102. In addition, the interrupt controller 106 utilizes the data bus 104, and the control bus 110 to communicate with the microprocessor 102 to let it know which hardware device 112–124 requires attention. The interrupt causes the microprocessor 102 to temporarily suspend execution of the current program and forces it to jump to another program, called the interrupt service routine, or ISR. After the microprocessor 102 services the interrupt, it returns to the original program at the point of interruption, and sends a signal to the interrupt controller 106 to clear the interrupt.

Now referring to FIG. 2, a diagram 200 illustrating program flow during an interrupt is shown. It should be understood that the program as shown, could be executed on the microprocessor 102 of FIG. 1. A program 202 is executing on the microprocessor 102 when the processor receives an interrupt on interrupt line 108. If the interrupt arrives during execution of an instruction 208, the interrupt will cause a branch 204 at position 210 (upon the completion of instruction 208). The branch 204 transfers execution from the executing program 202 to an exception handler 206. More specifically, program flow begins with an instruction service routine 212 which handles the interrupt condition. Upon completion of the interrupt service routine 212, program flow branches back to the executing program 202 at position 210.

What is illustrated by the above is how an interrupt condition causes interruption in program flow, from an executing program 202 to an interrupt service routine 212. However, interruption of program flow in an executing program is not always desirous, and depending on the executing program, can create serious problems. To prevent interrupts from interfering with the program flow of particular programs, interrupts are often "masked" by the processor during execution of those programs. Within the microprocessor 102 is a control register, or EFLAGS register (not shown), which contains a number of status bits, or flags, which are used to control I/O, interrupts, debugging and task switching. One of these flags is called the Interrupt Flag, or simply the IF bit. When this bit is cleared (i.e., equal to 0), then interrupts are said to be "masked". When the IF bit is set (i.e., equal to 1), then interrupts are allowed. By clearing the IF bit prior to execution of an interrupt sensitive program, interrupts are ignored during execution of that program. Upon completion of the program, the IF bit is set, which allows interrupts to be handled.

In x86 processors, there are three instructions which when executed, may set the IF bit to allow interrupts. The first two instructions, POPF and IRET, overwrite the contents of the control register with a previously stored value. If the IF bit was set in the previously stored control register value, then upon completion of execution of either of these instructions, interrupts will be allowed. In fact, if an interrupt is pending prior to execution of POPF or IRET, then the interrupt will be handled immediately upon completion of executing the POPF or IRET instruction.

The third instruction which sets the IF bit is the STI, or set interrupt flag, instruction. As with the above two instructions, when the STI instruction is executed, the IF bit is set, which allows the processor to handle interrupts. However, unlike the above two instructions, the architecture of x86 processors requires that if the IF bit was cleared prior to execution of the STI instruction, and if an interrupt is pending, either prior to execution of the STI instruction, or concurrent with the execution of the STI instruction, then interrupts are not to be handled until after execution of the instruction which follows STI. So, even after the STI instruction sets the IF bit to allow interrupts, pending interrupts are not to be handled, until after the processor executes the instruction following STI. Only then may the interrupt be handled. At least this was the stated operation of x86 processors for some time.

In 1995, an errata to the Pentium® microprocessor was made which corrected a flaw in the architecture. It was determined that if the STI instruction followed a floating point instruction, and if the floating point instruction created an error condition, and if the instruction which followed STI was a floating point instruction, then a pending interrupt must be handled immediately after execution of the STI instruction. Otherwise, the processor would hang waiting for the floating point error to clear prior to execution of the floating point instruction following STI. The errata therefore changed the specification of the processor to require that upon execution of the STI instruction, if the IF bit was previously clear, and if an interrupt is pending upon completion of the STI instruction, then the interrupt is not to be handled until after execution of the instruction following STI, unless the next instruction is a floating point instruction. In that instance, the interrupt is to be handled immediately.

So, the rule as it stands today, is to allow interrupts immediately after POPF and IRET instructions set the IF bit, to delay handling interrupts for one instruction after the STI instruction sets the IF bit, but to handle interrupts immediately after the STI instruction if the prior state of the IF bit was clear, and if the instruction following STI is a floating point instruction.

To implement the rule as stated above has heretofore required significant hardware within a microprocessor to determine whether interrupts are to be allowed after transition of the IF bit. The processor must determine what instruction was being executed at the time the IF bit made a transition (i.e., was it STI, POPF or IRET), whether the prior state of the IF bit was 1 or 0, and whether the instruction which follows the IF bit transition is a floating point instruction. For the processor to monitor each of these conditions, and implement the rule in a timely fashion, costly circuitry surrounding the control register, and the instruction decode/sequencing logic is required. In addition, once the circuitry is designed and placed within a processor, future modifications to the rule will require redesign of the circuitry within the processor. Such redesign is very costly, time consuming, and places manufacturers of x86 processors at a disadvantage when architectural changes are made.

SUMMARY

To address the above-detailed deficiencies, it is an object of the present invention to provide an apparatus and method which controls interrupt handling after setting of an interrupt flag, via a software control mechanism located within an exception handler, rather than by a complex hardware circuit.

It is a further object of the present invention to follow the architectural requirements of interrupt handling in x86 processors, upon mask flag transitions, by using an apparatus and method which is less costly than present implementations, and which is adaptable should the architectural requirements change.

Accordingly, in the attainment of the aforementioned object, it is a feature of the present invention to provide a method for controlling allowance of an interrupt within a processor, after setting an interrupt flag in a control register within the processor, where the method includes: setting the interrupt flag in the control register to allow interrupts; upon completion of setting the interrupt flag, checking whether an interrupt is pending; if an interrupt is not pending, executing the instruction following the setting of the interrupt flag; if an interrupt is pending, branching to an exception handler; within the exception handler, determining whether the instruction which performed the setting of the interrupt flag was a first type flag set instruction where an interrupt is permitted immediately upon its completion, or a second type flag set instruction, where an interrupt is not permitted immediately upon its completion; determining whether the interrupt flag was set or cleared prior to setting the interrupt flag; if the step of determining whether the instruction which performed the setting of the interrupt flag determines that the instruction was the second type flag set instruction, and if the step of determining whether the interrupt flag was set or cleared determines that the interrupt flag was cleared prior to the step of setting, then not handling the interrupt and branching back from the exception handler; otherwise, allowing the interrupt.

An advantage of the present invention is that complex hardware is not required to track whether or not a branch to an interrupt handler is required after setting the interrupt flag.

An additional advantage of the present invention is that if the architectural requirements with respect to interrupt handling is changed or modified, no changes in hardware will be required. Rather, minor changes in the exception handler can be made to accommodate the changed requirements. By placing control for interrupt handling after modification of the interrupt flag within the exception handler, significant expense typically associated with hardware modifications is entirely avoided.

In another aspect, it is a feature of the present invention to provide a processing system for executing a program, the processing system having an interrupt line for indicating that an interrupt condition is pending, the processing system including: an instruction cache, for storing the program to be executed by the processing system; a register file, connected to the instruction cache, the register file having a plurality of general purpose registers, the register file further including: a control register, the control register having a plurality of bits, the plurality of bits including an interrupt flag, the interrupt flag for indicating whether a pending interrupt condition may be handled. The processing system further includes: a control ROM, connected to the register file, the control ROM for storing a plurality of interrupt programs, the plurality of interrupt programs for handling interrupt conditions; a temporary register, connected to the register file, for temporarily storing a last value of the control register; and an exception program counter, connected to the instruction cache, for temporarily storing an address corresponding to a last executed instruction; a macro instruction, stored within the instruction cache, for setting the interrupt flag to indicate that an interrupt condition should be handled; and an exception handler, also stored within the control ROM, for determining whether the macro instruction has been executed to set the interrupt flag, whether the interrupt flag was set prior to the execution of the macro instruction, and whether an interrupt is pending on the interrupt line; whereby if an interrupt is pending on the interrupt line, the exception handler branches to one of the plurality of interrupt programs to handle the interrupt, if the interrupt flag is set, but not if the macro instruction which set the interrupt flag was the last instruction to be executed, and if the interrupt flag was cleared prior to execution of the last instruction.

BRIEF DESCRIPTION OF THE DRAWINGS

These and other objects, features, and advantages of the present invention will become better understood with regard to the following description, and accompanying drawings where.

DETAILED DESCRIPTION

Figure 1:
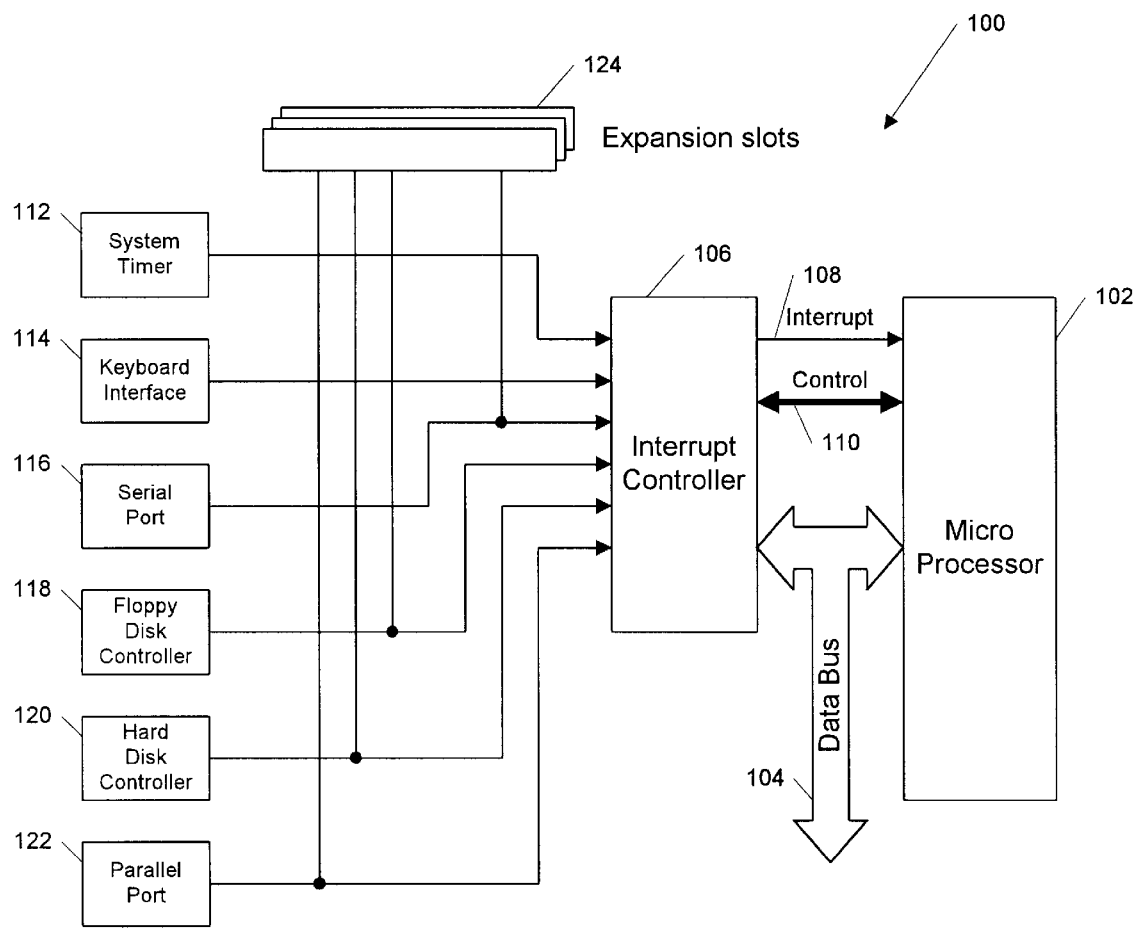
FIG. 1 is a schematic diagram of a computer system which illustrates hardware interrupts to a microprocessor.
Figure 2:
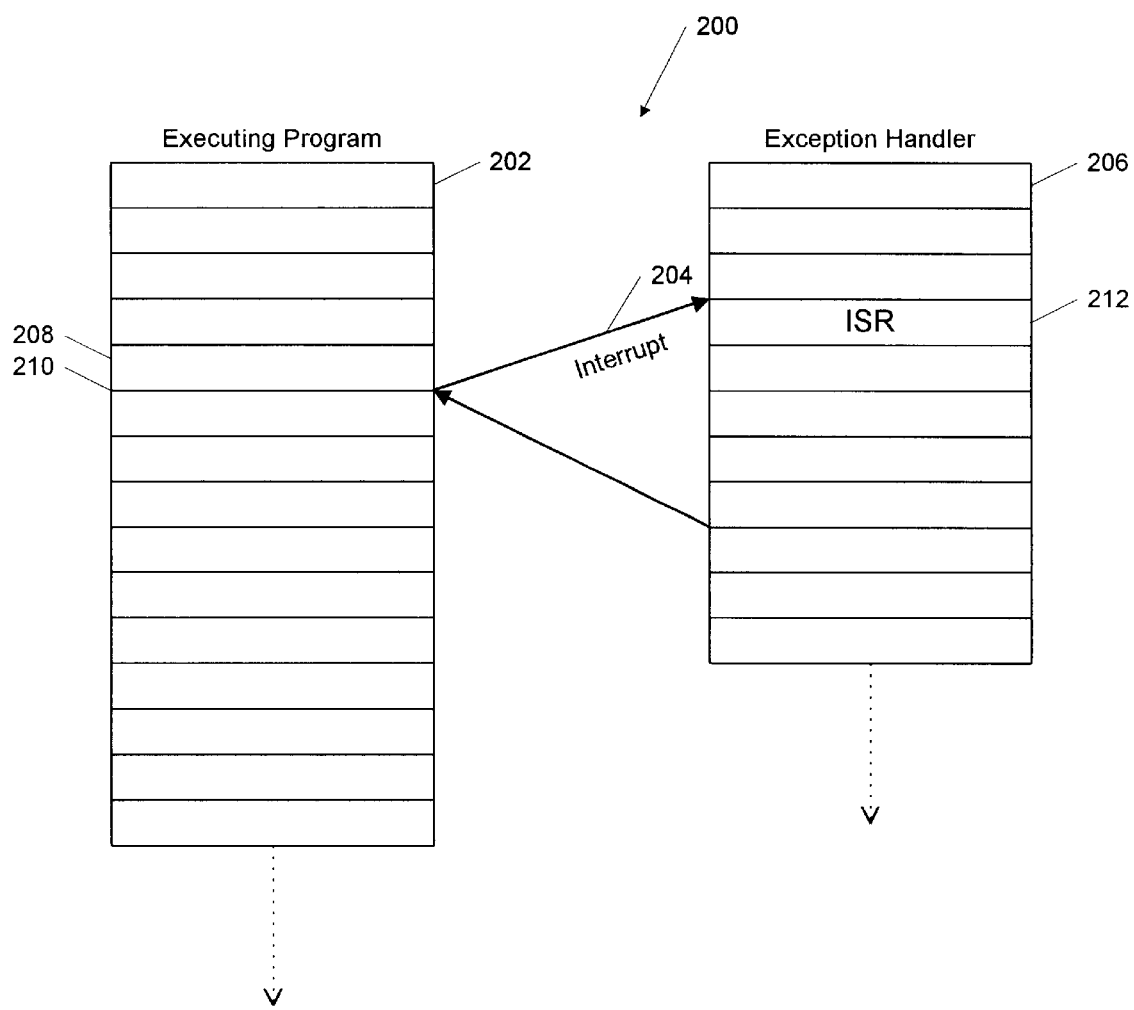
FIG. 2 is a diagram which illustrates program flow in a computer system which has an interrupt.
Figure 3:
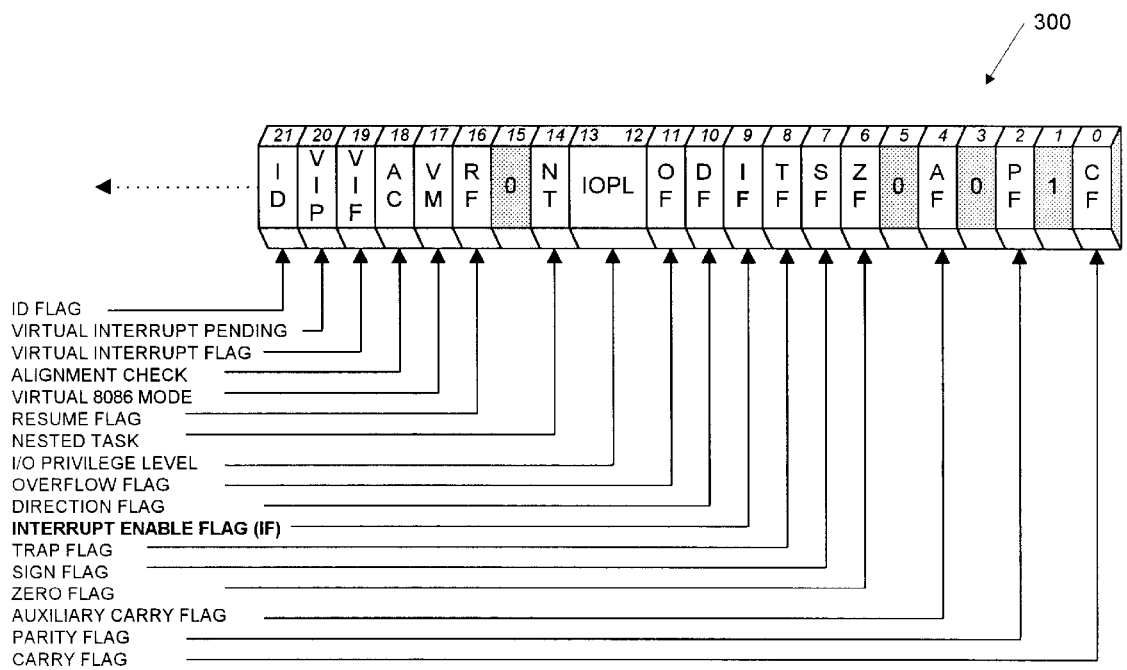
FIG. 3 is a schematic representation of a control register within a computer system, specifically illustrating an interrupt flag.

Referring to FIG. 3, a portion of a control register 300 is shown. One skilled in the art will appreciate that the control register 300 is one of a number of registers within a microprocessor which are accessible by a programmer, and which are used to control I/O, interrupts, debugging, task switching, and virtual-8086 mode. More specifically, bit 9 of the control register 300 is the IF (Interrupt Enable Flag) bit.

Figure 4:
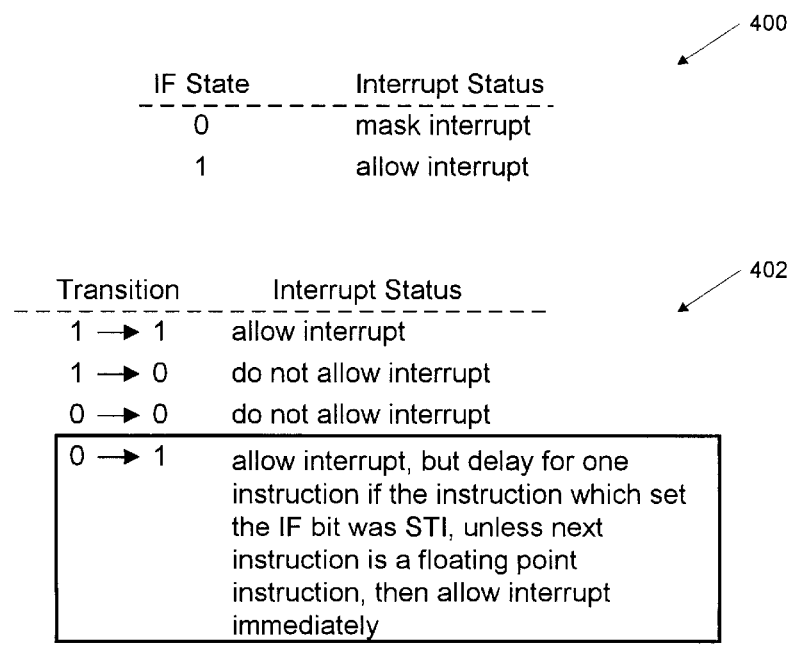
FIG. 4 is a table which illustrates program flow for pending interrupts when transitions occur in the interrupt flag.

Now referring to FIG. 4, a table 400 is shown which illustrates whether interrupts should be masked or handled based on the status of the IF bit. When the IF bit contains a zero, it is considered cleared, and indicates to the processor that interrupts are to be masked. When the IF bit contains a one, it is considered set, and indicates to the processor that interrupts are to be handled.

In addition, FIG. 4 includes a table 402 which illustrates whether an interrupt should be allowed after the IF bit transitions from one state to another. As mentioned above, whether or not an interrupt is handled immediately is determined by the state of the IF bit. If cleared, the interrupt is masked. If set, the interrupt is handled. However, if the IF bit transitions from 0 to 1, and if the transition is caused by the STI instruction, an interrupt is delayed for one instruction, unless the instruction following STI is a floating point instruction. In this case, the interrupt is to be handled immediately.

Figure 5:
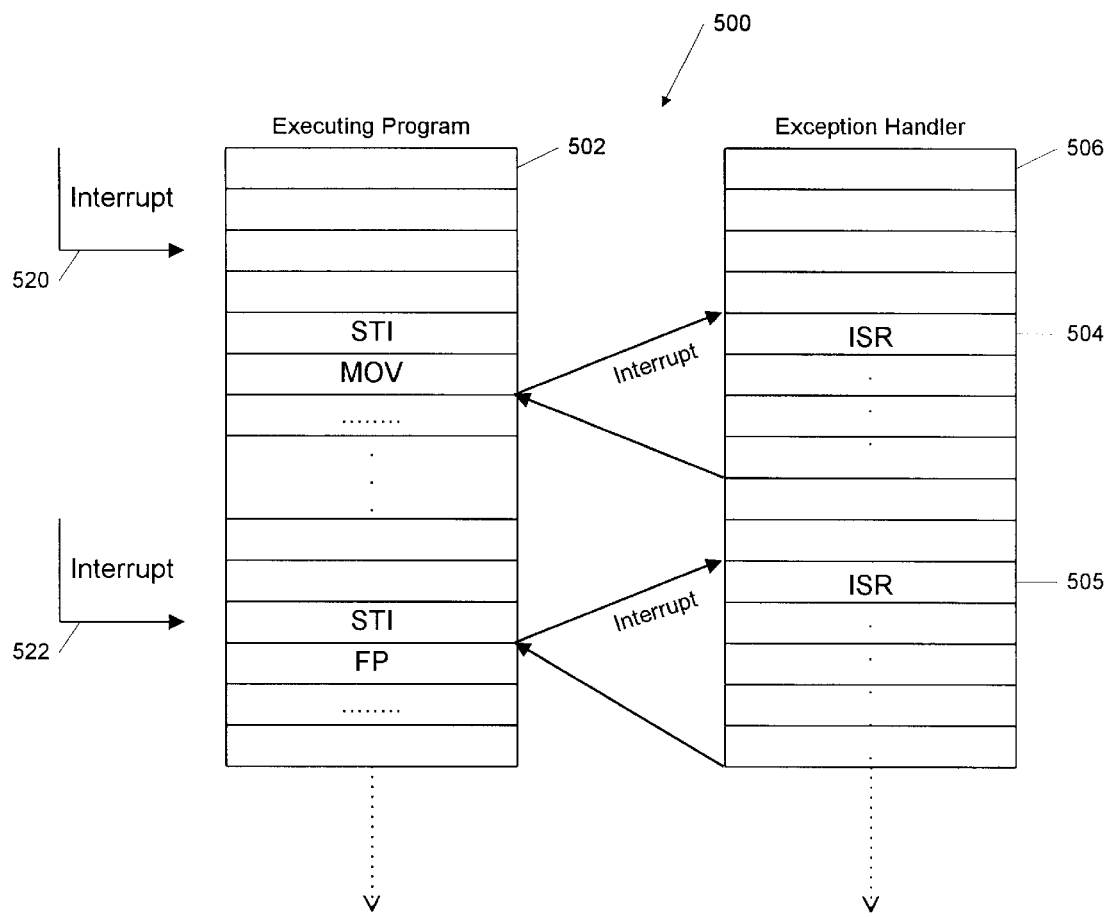
FIG. 5 is a diagram illustrating program flow in an x86 processor based system which has two interrupts. The first interrupt occurs prior to the interrupt flag being set, followed by an integer instruction. The second interrupt occurs prior to the interrupt flag being set, followed by a floating point instruction.

To further illustrate table 402, as it effects program flow, attention is directed to FIG. 5. In FIG. 5, a diagram 500 is provided which shows program flow between an executing program 502 and an exception handler 506. During execution of program 502, an interrupt 520 occurs. At this point, the IF bit is cleared, so the interrupt is masked until the IF bit is set. After executing the STI instruction, interrupt 520 is delayed for one more instruction (e.g., the MOV instruction). The interrupt is then handled by branching to an interrupt service routine (ISR) 504 within the exception handler 506. Upon completion of the ISR 504, program flow returns to the executing program 502 at the point where the interrupt branch occured.

At some later time during execution of the program 502 it is presumed that the IF bit is cleared. At this point an interrupt 522 occurs. The interrupt 522 is masked until the IF bit is set. When the STI instruction sets the IF bit, interrupt 522 causes program flow to branch immediately to ISR 505 within the exception handler 506. The branch occurs immediately because the STI instruction is followed by a floating point instruction. Upon completion of the ISR 505, program flow branches back to the executing program 502 at the point where the interrupt branch occurred.

Figure 6:
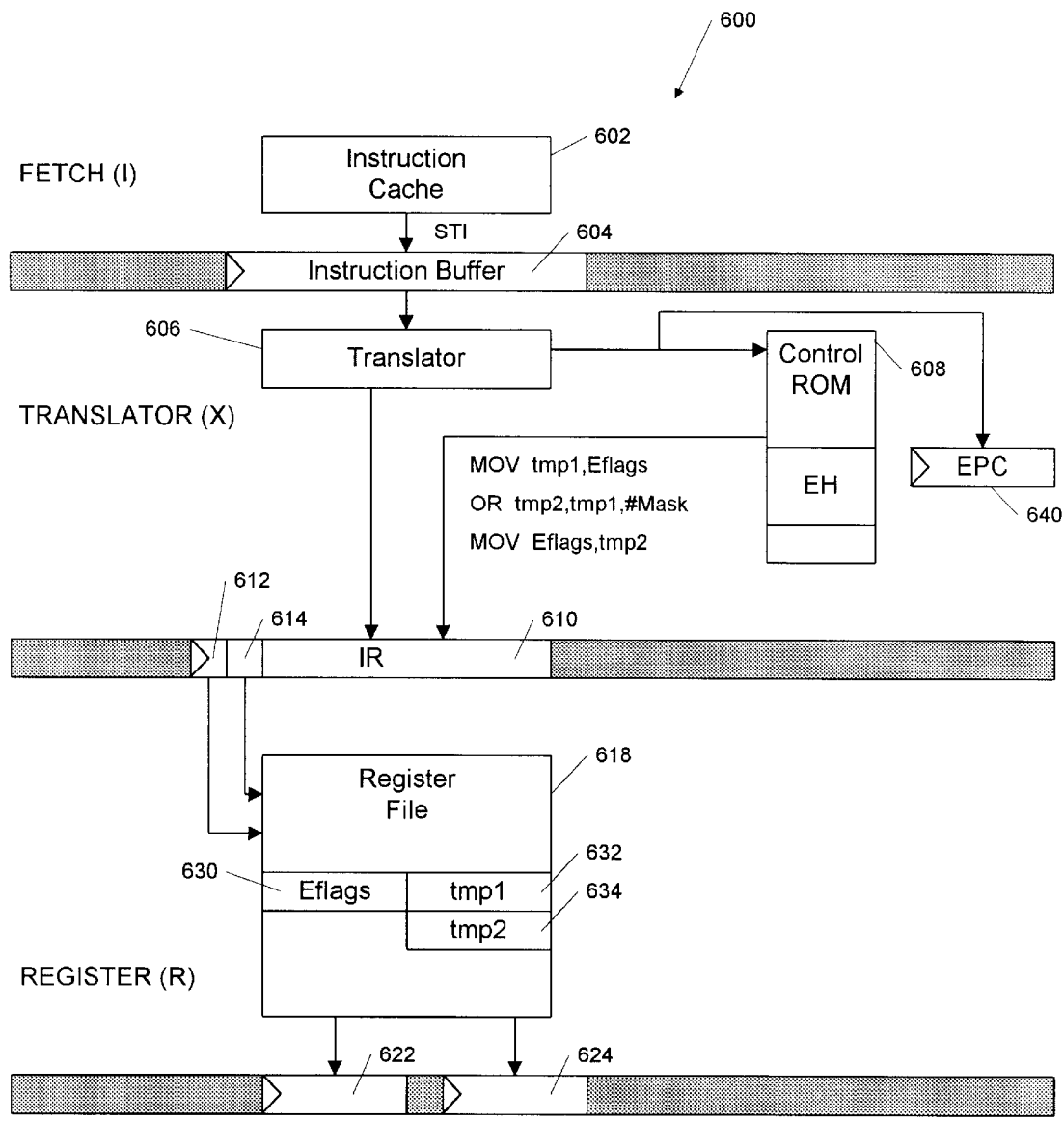
FIG. 6 is a partial schematic diagram of a pipeline processor which incorporates the present invention.

The above description, associated with FIGS. 3–5, illustrate the operation of a processor which meets the x86 architectural requirements upon transition of the mask flag IF. Attention is now directed to FIG. 6.

FIG. 6 is a block diagram of a portion of a pipeline processor 600 which embodies the present invention. The processor 600 includes an instruction cache 602 for storing instructions to be executed by the processor 600. The instruction cache 602 is connected to an instruction buffer 604 which temporarily holds the next instruction to be executed by the processor 600. For purposes of illustration, an STI instruction is shown provided by the instruction cache 602 to the instruction buffer 604. The instruction buffer 604 is connected to a translator 606 which translates the STI instruction into a sequence of micro instructions which will be executed by the processor 600.

More specifically, the translator 606 determines that the instruction in the instruction buffer 604 is an STI instruction. The translator 606 addresses the appropriate micro instruction sequence within a control ROM 608 which implements the STI instruction. The micro instructions within the sequence are provided, one at a time, to an instruction register 610 for use by later stages in the pipeline processor 600. In addition, an exception program counter (EPC) 640 is provided which stores the address for the micro instruction sequence pertaining to the instruction contained in the instruction buffer 604. In this instance, the address corresponds to the STI instruction.

Within the instruction register 610 are two operand locations 612, 614 which are used to provide the operands associated with each micro instruction to a register file 618. The register file 618 contains a plurality of general purpose registers, segment registers and control registers (not shown) which are addressed by the operands 612, 614 to provide data and address information to temporary buffers 622, 624 for use by later stages in the pipeline processor 600.

In addition, the register file 618 contains an Eflags register 630 for storing control information, such as the IF bit. The register file 618 also contains a temporary register tmp1 632 and a temporary register tmp2 634 for use as follows.

The first micro instruction which is provided to the instruction register 610 when the STI instruction is in the instruction buffer 604 is MOV tmp1,Eflags. This instruction causes the contents of the Eflags register 630 to be copied into the tmp1 register 632. The second instruction in the sequence is OR tmp2,tmp1,#MASK. This instruction performs an OR operation between the contents of the tmp1 register 632 and an immediate operand #MASK and places the result of the OR in the tmp2 634 register. To set the IF bit equal to 1, and not modify any other bit in the Eflags register 630, the #MASK would contain all zeroes except in bit position 9, where it would contain a one.

The third micro instruction, MOV Eflags,tmp2, moves the contents of the tmp2 register 634 into the Eflags register 630. Execution of these three micro instructions sets the IF bit within the Eflags register 630, and thereby allows the processor 600 to allow interrupts.

What should be appreciated, at this point, is that in setting the IF bit, one of the temporary registers, tmp1 632, still contains the contents of the Eflags register prior to setting the IF bit. And, if no other instructions are executed before examining the tmp1 register 632, the prior state of the IF bit can be determined. Furthermore, the address stored in the EPC 640 still points to the micro instruction sequence pertaining to the instruction STI. By examining the EPC 640, it can be determined whether STI was previously executed. With this in mind, attention is now directed to FIG. 7.

Figure 7:
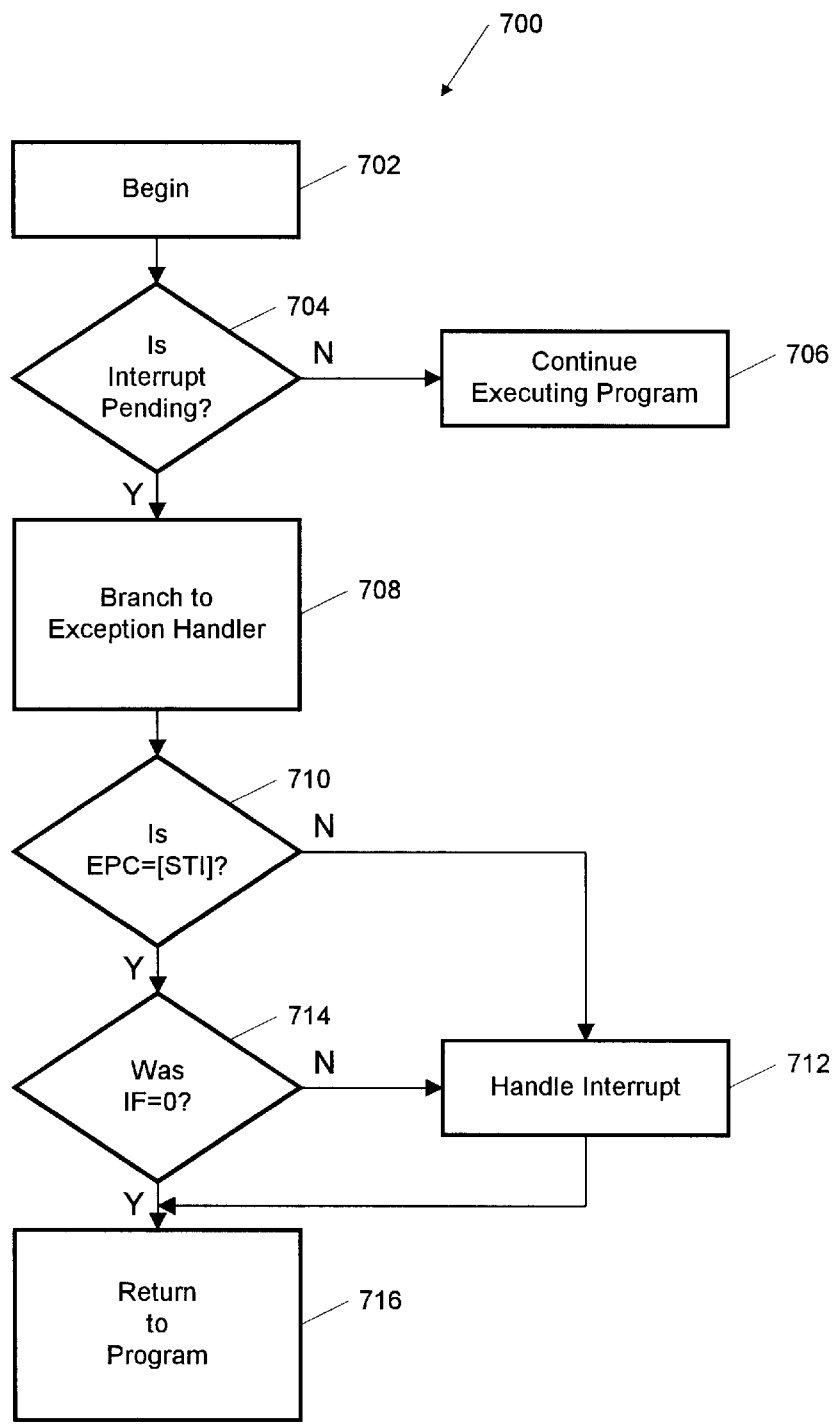
FIG. 7 is a flow chart illustrating program flow in an exception handler according to the present invention.

FIG. 7 provides a flow chart 700 which illustrates program flow during an interrupt according to the present invention. In one embodiment, if the IF bit is set, interrupts cause an immediate branch to the exception handler, whether or not the instruction which set the IF bit was an STI instruction, whether or not the prior state of the IF bit was cleared, and whether or not the next instruction is a floating point instruction. Flow chart 700 begins at block 702. Flow proceeds to decision block 704.

At decision block 704, a determination is made as to whether an interrupt is pending for the processor 600. If not, then program flow proceeds to block 706 where the program continues execution. If an interrupt is pending, program flow proceeds to block 708.

At block 708, the processor branches to the exception handler. Program flow then proceeds to decision block 710.

At decision block 710, the exception handler determines whether the contents of the EPC 640 contain the address corresponding to the STI micro instruction sequence. If not, then the exception handler branches to the ISR for the pending interrupt, and handles the interrupt, at block 712. Program flow then branches back to the main program, at block 716. If however the EPC=[STI], then program flow proceeds to decision block 714.

At decision block 714, the processor examines the tmp1 register 632 to determine whether the IF bit was set or cleared. If the prior state of the IF bit was 1, then program flow proceeds to the ISR pertaining to the interrupt, and the interrupt is handled, at block 712. Program flow then proceeds back to the main program, at block 716.

However, if it is determined that the prior state of the IF bit was 0, then the interrupt is temporarily ignored, and program flow branches back to the main program, at block 716. In this instance, it has been determined that an interrupt was pending, that an STI instruction set the IF bit, and the prior state of the IF bit was zero. To follow the rule for mask flag transition, interrupts are not to be handled until after the instruction following the STI instruction, unless the next instruction is a floating point instruction.

The above invention presumes that if an interrupt is pending, and the IF bit is set, that the interrupt should be handled. Branching therefore occurs to the exception handler which determines whether or not the special case for STI exists. If not, then the interrupt is handled. If so, then program flow returns back to the main program without handling the interrupt. By branching to the exception handler when interrupts are pending, and when the IF bit is set, mask flag transitions unrelated to STI are handled directly. And, when the prior state of the IF bit was 1, interrupts are handled directly. However, for the special case where the prior state of IF was 0, and the IF bit was set by STI, the interrupt is ignored.

By utilizing the exception handler, along with tmp1 register 632, and EPC 640, control for interrupt handling has been performed, without requiring specialized hardware to track IF bit transitions, and the STI instruction. In fact, no additional hardware has been required to determine whether or not an interrupt should be handled after an IF bit transition. If future architectural changes are made which require different conditions relating to interrupt handling, implementation of the changes can very likely be made by modifying the exception handler, and without modifying any hardware in the processor.

Thus, x86 architectural requirements for interrupt handling after a mask flag transition have been met by using an exception handler, rather than complex hardware tracking mechanisms. For the special case where the prior state of the IF bit was clear, and the IF bit is set by the STI instruction, and the instruction following STI is a floating point instruction, see related application Ser. No. 08/800,612 entitled MECHANISM FOR MANAGING INTERRUPT DELAY FOR FLOATING POINT ERRORS, by Gerald Col and Glenn Henry.

Although the present invention has been described in considerable detail with reference to certain preferred versions thereof, other versions are possible. For example, temporarily locations other than tmp1 and EPC may be used to store information related to the prior state of the IF bit, and the prior instruction which was executed by the processor. These were used in the present embodiment because both were already available, and did not require any additional modifications to the processor. In addition, the above described invention does not preclude a manufacturer from including some hardware tracking mechanism for handling interrupts. Rather, the invention presumes that if the IF bit is set, and an interrupt is pending, a branch should occur to a program which determines whether the interrupt should be handled.

Although the present invention and its objects, features and advantages have been described in detail, those skilled in the art should appreciate that they can readily use the disclosed conception and specific embodiment as a basis for designing or modifying other structures for carrying out the same purposes of the present invention, and that various changes, substitutions and alterations can be made herein without departing from the spirit and scope of the invention as defined by the appended claims.

We claim:

1. A method for controlling allowance of an interrupt within a processor, after setting an interrupt flag in a control register within the processor, the method comprising the steps of:
    a) setting the interrupt flag in the control register to allow an interrupt;
    b) after setting the interrupt flag, checking whether an interrupt is pending;
    c) if an interrupt is not pending, executing an instruction which follows step a);
    d) if an interrupt is pending, branching to an exception handler;
    e) within the exception handler, determining whether an instruction that performed step a) was a first type flag set instruction, or a second type flag set instruction;

f) determining whether the interrupt flag was set or cleared prior to step a);

g) if step e) indicates that the instruction was the second type flag set instruction, and if step f) indicates that the interrupt flag was cleared prior to step a), ignoring the interrupt and branching back from the exception handler;

h) otherwise, allowing the interrupt.

2. The method for controlling allowance of an interrupt, as recited in claim 1, wherein the control register is a flags register which comprises flags used by the processor to control program flow.

3. The method for controlling allowance of an interrupt, as recited in claim 1, wherein the interrupt flag is a single bit which is used to indicate whether interrupts should be allowed or ignored.

4. The method for controlling allowance of an interrupt, as recited in claim 3, wherein the interrupt flag is cleared, interrupts are masked.

5. The method for controlling allowance of an interrupt, as recited in claim 3, wherein if the interrupt flag is set, interrupts are not masked.

6. The method for controlling allowance of an interrupt, as recited in claim 1, wherein if an interrupt is allowed, program flow within the processor is caused to branch to an interrupt program which handles the interrupt.

7. The method for controlling allowance of an interrupt, as recited in claim 6, wherein the interrupt program is located within the exception handler.

8. The method for controlling allowance of an interrupt, as recited in claim 1, wherein said step of setting the interrupt flag in the control register provides indicia to the processor that interrupts are not to be masked.

9. The method for controlling allowance of an interrupt, as recited in claim 1, wherein the processor includes an interrupt line.

10. The method for controlling allowance of an interrupt, as recited in claim 9, wherein said step of checking further comprises examining whether the interrupt line on the processor has received an interrupt signal.

11. The method for controlling allowance of an interrupt, as recited in claim 1, wherein the exception handler comprises a plurality of programs for handling exceptions and interrupts.

12. The method for controlling allowance of an interrupt, as recited in claim 1, wherein the exception handler is stored within a control ROM within the processor.

13. The method for controlling allowance of an interrupt, as recited in claim 1, wherein the first type flag set instruction comprises a POPF instruction.

14. The method for controlling allowance of an interrupt, as recited in claim 1, wherein the first type flag set instruction comprises an IRET instruction.

15. The method for controlling allowance of an interrupt, as recited in claim 1, wherein the second type flag set instruction comprises an STI instruction.

16. The method for controlling allowance of an interrupt, as recited in claim 1, wherein if the instruction which performed step a) was the second type flag set instruction, an interrupt is masked until after execution of the instruction following step a).

17. The method for controlling allowance of an interrupt, as recited in claim 1, wherein step e) further comprises the steps of:

reading an exception program counter pertaining to the last instruction executed by the processor;

determining whether the contents of the exception program counter correspond to the second type flag set instruction.

18. The method for controlling allowance of an interrupt, as recited in claim 1, wherein step f) further comprises the step of reading a temporary register which contains the contents of the control register as it was prior to said step of setting the interrupt flag.

19. The method for controlling allowance of an interrupt, as recited in claim 1, wherein step g) further comprises the step of executing the instruction following said step of setting the interrupt flag.

20. The method for controlling allowance of an interrupt, as recited in claim 1, wherein step h) further comprises the step of executing an interrupt routine within the exception handler pertaining to the interrupt.

21. A processing system for executing a program, the processing system having an interrupt line for indicating that an interrupt condition is pending, the processing system comprising:

an instruction cache, for storing the program to be executed by the processing system;

a register file, connected to said instruction cache, said register file having a plurality of general purpose registers, said register file further comprising:

a control register, said control register having a plurality of bits, said plurality of bits comprising an interrupt flag, said interrupt flag for indicating whether a pending interrupt condition may be handled;

a control ROM, connected to said register file, the control ROM for storing a plurality of interrupt programs, said plurality of interrupt programs for handling interrupt conditions;

a temporary register, connected to the register file, for temporarily storing a last value of said control register; and an exception program counter, connected to said instruction cache, for temporarily storing an address corresponding to a last executed instruction;

a macro instruction, stored within said instruction cache, for setting said interrupt flag to indicate that an interrupt condition should be handled; and an exception handler, also stored within said control ROM, for determining whether said macro instruction has been executed to set said interrupt flag, whether said interrupt flag was set prior to the execution of said macro instruction, and whether an interrupt is pending on said interrupt line;

whereby if an interrupt is pending on said interrupt line, said exception handler branches to one of said plurality of interrupt programs to handle said interrupt, if said interrupt flag is set, but not if said macro instruction which set said interrupt flag was the last instruction to be executed, and if said interrupt flag was cleared prior to execution of said last instruction.

22. The processing system, as recited in claim 21, wherein the processing system is a microprocessor.

23. The processing system, as recited in claim 21, wherein an interrupt condition may be created by a keyboard interface, a parallel port, or a hard disk controller.

24. The processing system, as recited in claim 21, wherein said interrupt line is connected to an interrupt controller which provides a signal on said interrupt line to indicate that an interrupt condition is pending.

25. The processing system, as recited in claim 21, wherein when said interrupt flag is cleared, said pending interrupt condition may not be handled.

26. The processing system, as recited in claim 21, wherein said control ROM also stores micro instruction sequences, corresponding to macro instructions, for execution by said processing system.

27. The processing system, as recited in claim 21, wherein said control register may be overwritten by said processing system, when setting or clearing said interrupt flag.

28. The processing system, as recited in claim 27, wherein when said control register is overwritten, said last value of said control register is stored in said temporary register.

29. The processing system, as recited in claim 28, wherein said temporary register contains the previous value of said interrupt flag before said control register was overwritten.

30. The processing system, as recited in claim 21, wherein said temporary register may later be read by said processing system to determine said previous value of said interrupt flag.

31. The processing system, as recited in claim 21, wherein said exception program counter may be read by said processing system to determine said last executed instruction.

32. The processing system, as recited in claim 21, wherein said macro instruction comprises an STI instruction.

33. The processing system, as recited in claim 21, wherein handling said interrupt condition comprises branching to one of said plurality of interrupt programs stored in said control ROM.

34. The processing system, as recited in claim 21, wherein said exception handler comprises a program which reads said exception program counter, and said temporary register prior to branching or not branching to said one of said plurality of interrupt programs.

* * * * *